United States Patent
Nicholson et al.

(10) Patent No.: US 12,028,643 B2
(45) Date of Patent: Jul. 2, 2024

(54) DYNAMIC VIRTUAL BACKGROUND FOR VIDEO CONFERENCE

(71) Applicant: Lenovo (United States) Inc., Morrisville, NC (US)

(72) Inventors: John W. Nicholson, Cary, NC (US); Daryl C. Cromer, Raleigh, NC (US); Howard Locker, Cary, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 170 days.

(21) Appl. No.: 17/701,139

(22) Filed: Mar. 22, 2022

(65) Prior Publication Data

US 2023/0308603 A1    Sep. 28, 2023

(51) Int. Cl.
| | | |
|---|---|---|
| H04N 7/15 | (2006.01) | |
| G06T 7/194 | (2017.01) | |
| H04N 5/272 | (2006.01) | |

(52) U.S. Cl.
CPC ............ *H04N 5/272* (2013.01); *G06T 7/194* (2017.01); *H04N 7/152* (2013.01); *G06T 2207/10016* (2013.01); *G06T 2207/30196* (2013.01)

(58) Field of Classification Search
CPC .......... H04N 7/15; H04N 7/152; H04N 7/157
See application file for complete search history.

(56) References Cited

U.S. PATENT DOCUMENTS

| | | | |
|---|---|---|---|
| 2006/0100839 A1 | 5/2006 | Horiuchi et al. | |
| 2017/0195591 A1 | 7/2017 | Avadhanam et al. | |
| 2017/0235355 A1* | 8/2017 | Alshinnawi | G06F 1/1677 |
| | | | 713/323 |
| 2018/0343448 A1 | 11/2018 | Possos et al. | |
| 2019/0020894 A1 | 1/2019 | Peng et al. | |
| 2020/0364834 A1 | 11/2020 | Ferrés et al. | |
| 2021/0306555 A1* | 9/2021 | Ostap | H04N 23/69 |
| 2022/0070389 A1* | 3/2022 | Tangeland | G06T 5/73 |
| 2022/0188986 A1 | 6/2022 | Rahmati et al. | |
| 2022/0256076 A1 | 8/2022 | Douady et al. | |
| 2023/0300292 A1* | 9/2023 | Barbosa da Silva | ...... |
| | | | H04L 12/1827 |
| | | | 348/14.07 |

OTHER PUBLICATIONS

Mutha, Nitish S., "How to map Equirectangular projection to Rectilinear projection", Equirectangular, 360degree, Jun. 12, 2017, retrieved from http://blog.nitishmutha.com/equirectangular/360degree/2017/06/12/How-to-project-Equirectangular-image-to-rectilinear-view.html.

Bryson et al., "Device Motion Aware Temporal Denoising", file history of related U.S. Appl. No. 17/569,768, filed Jan. 6, 2022.

* cited by examiner

*Primary Examiner* — Ryan McCulley
(74) *Attorney, Agent, or Firm* — John M. Rogitz; John L. Rogitz (57) ABSTRACT

In one aspect, a first device may include at least one processor and storage accessible to the at least one processor. The storage may include instructions executable by the at least one processor to facilitate a video conference with a second device and to apply a virtual background for a video stream provided to the second device as part of the video conference. The video stream may also show at least one user. The virtual background may change perspective as a field of view showing the user changes and/or as an actual background behind the user changes.

20 Claims, 5 Drawing Sheets

DYNAMIC VIRTUAL BACKGROUND FOR VIDEO CONFERENCE

FIELD

The disclosure below relates to technically inventive, non-routine solutions that are necessarily rooted in computer technology and that produce concrete technical improvements. In particular, the disclosure below relates to dynamic virtual backgrounds for video conferences.

BACKGROUND

As recognized herein, electronic video conferences sometimes use virtual backgrounds to mask the actual backgrounds of conference participants for digital privacy and other purposes. However, as also recognized herein, these virtual backgrounds remain static even if a user moves with their device or moves the device itself while conferencing, resulting in an unrealistic appearance to viewers that undermines the virtual background appearing as life-like as possible. Additionally, as further recognized herein, changes to real or virtual focal length for the video showing the user can also result in a jarring effect that undermines the virtual background appearing as life-like as possible since here too the virtual background remains static. There are currently no adequate solutions to the foregoing computer-related, technological problem.

SUMMARY

Accordingly, in one aspect a first device includes at least one processor and storage accessible to the at least one processor. The storage includes instructions executable by the at least one processor to facilitate a video conference with a second device and apply a virtual background for a video stream provided to the second device as part of the video conference. The video stream also shows at least one user, and the virtual background changes perspective as a field of view showing the user changes and/or as an actual background behind the user changes.

Thus, in certain example implementations a three-dimensional (3D) model may be used to apply the virtual background. E.g., part of the 3D model may be selected to establish the virtual background, where the selected part of the 3D model may change to change the perspective of the virtual background. The 3D model may be cropped to establish the virtual background, where the cropping may change to change the perspective of the virtual background.

Also in certain example implementations, a panoramic image may be used to apply the virtual background. E.g., part of the panoramic image may be selected to establish the virtual background, where the selected part of the panoramic image may change to change the perspective of the virtual background.

Still further, in various examples the virtual background may change perspective to mimic an actual change to an actual background according to the field of view showing the user and/or the actual background behind the user.

In various example embodiments, the first device may include a server facilitating the video conference and/or a client device being used to participate in the video conference.

Also in certain example embodiments, the first device may include a camera that images the user as part of the video stream.

In another aspect, a method includes facilitating, using a first device, a video conference with a second device. The method also includes applying a virtual background for a video stream provided to the second device as part of the video conference. The video stream also shows at least one user, and the virtual background changes perspective as a field of view showing the user changes and/or as an actual background behind the user changes.

In certain examples the virtual background may change perspective as the field of view showing the user changes such that the virtual background changes responsive to changes, based on execution of auto-framing, to the field of view showing the user software.

Also in certain examples, the virtual background may change perspective as the actual background behind the user changes as identified based on input from at least one sensor. The input may include, for example, input from a potentiometer, an accelerometer, and/or a camera.

In another aspect, at least one computer readable storage medium (CRSM) that is not a transitory signal includes instructions executable by at least one processor to apply a virtual background for a video stream provided to a device as part of a video conference. The virtual background dynamically changes perspective responsive to a perspective from a camera changing and/or a field of view of a user changing.

In certain example implementations, the user may be a first user, the virtual background may dynamically change perspective responsive to the field of view of the first user changing, and the at least one processor may change the field of view of the first user responsive to a second, different user being detected via the camera.

The details of present principles, both as to their structure and operation, can best be understood in reference to the accompanying drawings, in which like reference numerals refer to like parts, and in which:

DETAILED DESCRIPTION

Among other things, the detailed description below deals with moving a virtual background scene during video conferencing in a realistic way consistent with a camera's physical and/or virtual motion. Physical motion may be actual movement of the camera through real world space (e.g., in the case of a laptop with an integrated camera, the movement may be through hinge rotation). Virtual motion may include auto-framing where the presented camera perspective changes, even if the actual camera location in the real world does not. Thus, virtual motion might include adjustment of the region of interest (e.g., the crop window/digital window that is streamed to others). Accordingly, adjusting the region of interest may be modeled as a change of the field-of-view, orientation, and/or zoom/focal length of the "virtual" camera. More generally, note here that the virtual background may change perspective as the field of view showing the user changes, where in certain examples the field of view showing the user may relate to the virtual or physical focal length being used to capture the user.

Thus, consistent with present principles the virtual background may be larger than a given segment that might be used at any given time during conferencing (e.g., the output resolution), and a center crop may be used initially. As the camera is moved physically or virtually, the crop position may also be moved/altered correspondingly.

However, in some examples, instead of a center crop initially, the crop position may be determined by the hinge angle if a laptop computer or other device with a hinge is used. Or more generally for not just laptops but also tablets, smartphones, etc., to determine the pose of the camera an accelerometer, and/or accelerometer and gyroscope in combination, may be used. Thus, if the camera or streaming itself is started while the hinge angle is small/acute or while the pose of the camera is otherwise angled down, the crop may start towards the bottom of the 3D model, 3D mesh, or larger image being used as the virtual background. Additionally, auto-framing for virtual camera position may straightforwardly align with the virtual background crop position, and may not start in the center crop.

As alluded to above, a 3D model or panoramic background (e.g., captured through rotation of a camera to capture a panorama of a scene) may be used. Images generated with wide-angle lenses, which may have a more noticeable non-linearity further from the center, may also be used. In these instances, as a crop position of the wide-angle lens image goes toward the extremes where the image might appear slightly distorted via a fish-bowl effect, image processing software may be used to either distort the foreground video stream of the video conference participant themselves to match the distortion of the cropped portion of the image, or the cropped portion of the image at the extreme may be processed to make it appear non-distorted or flat for use with a non-distorted foreground stream of the user themselves. Or the use may appear non-distorted while the cropped portion of the image continues to appear distorted due to the wide-angle lens effect. Regardless, the wide-angle lens images might be particularly useful during auto-framing, for example.

Also consistent with present principles and for a laptop computer or other device with a hinge specifically, the hinge angle may be measured using, for example, a potentiometer, separate accelerometers in the lid and base, or other methods.

Also in some embodiments, the hinge angle (and/or hinge movement) may be detected/estimated from image or video analysis as well. For example, the device may determine if motion shown in the camera feed is whole-image motion (denoting the entire device is moving or at least the panel with the camera) or if the motion is object-dependent motion (denoting that the object shown in the feed is moving while the device stays still) to thus distinguish device motion from subject motion.

Additionally, present principles may be extended to three-degrees-of-freedom and six-degrees-of-freedom motion of the device, not just hinge motion. For example, if the device is translated/slid along a desk or tabletop, or moved in a person's lap, or moved as they walk between rooms, the virtual background may change accordingly. Thus, owing to the 3D model or image being larger than the cropped section presented as the virtual background at any given moment, the crop position may change throughout the image/3D scene.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical Uis described herein may be consolidated and/or expanded, and UI elements may be mixed and matched between Uis.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
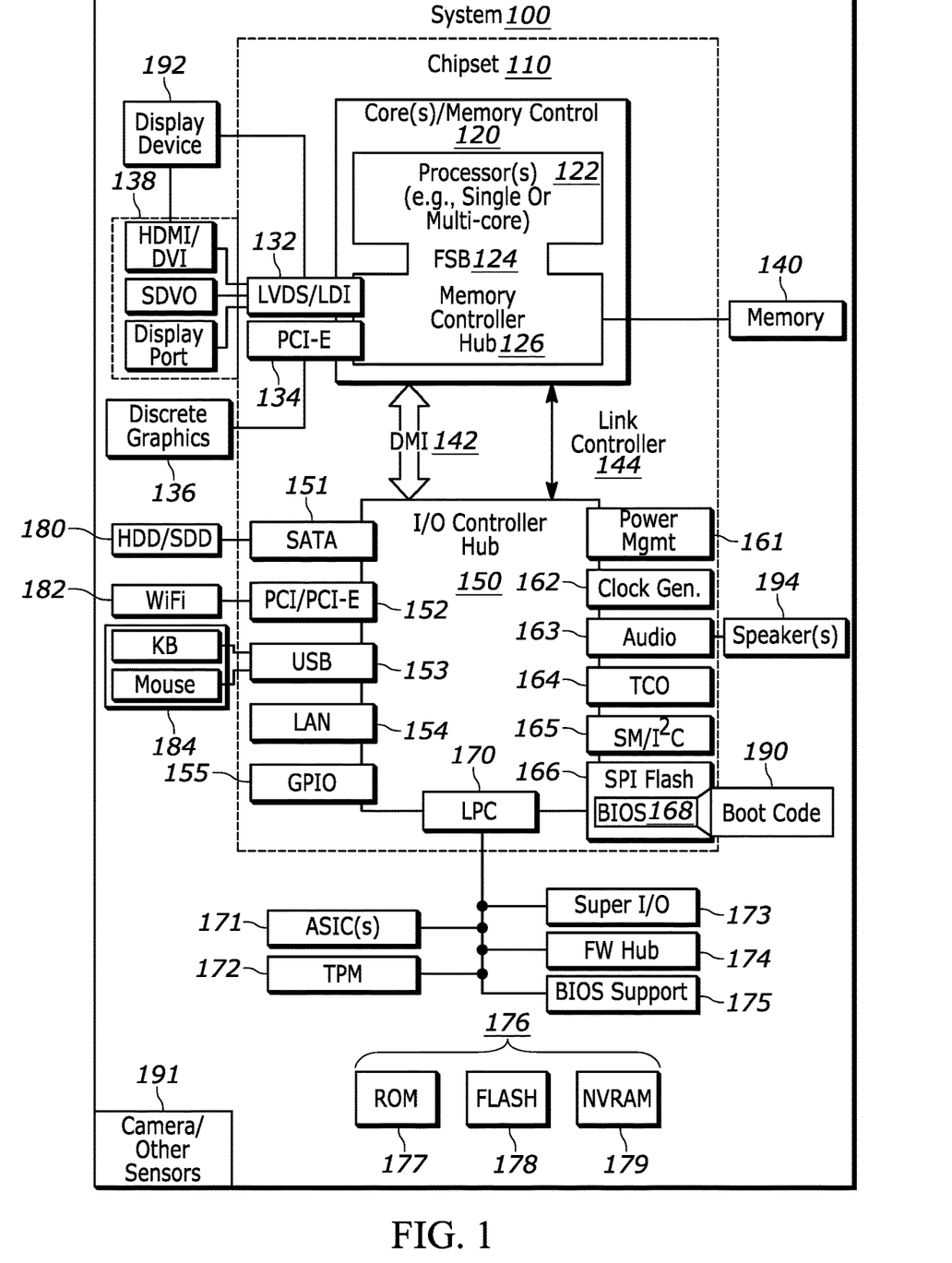
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191 that provide input to the one or more processors 122. The sensors 191 may include a camera, inertial sensor like an accelerometer or gyroscope, and/or a potentiometer. If a camera is used, the camera may be a digital camera or webcam, though other types of cameras may also be used such as a thermal imaging camera, an infrared (IR) camera, a three-dimensional (3D) camera, and/or another type of camera integrated into the system 100 and controllable by the processor 122 to gather still images and/or video.

Additionally, though not shown for simplicity, in some embodiments the system 100 may include an audio receiver/microphone that provides input from the microphone to the processor 122 based on audio that is detected, such as via a user providing audible input to the microphone for video conferencing. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
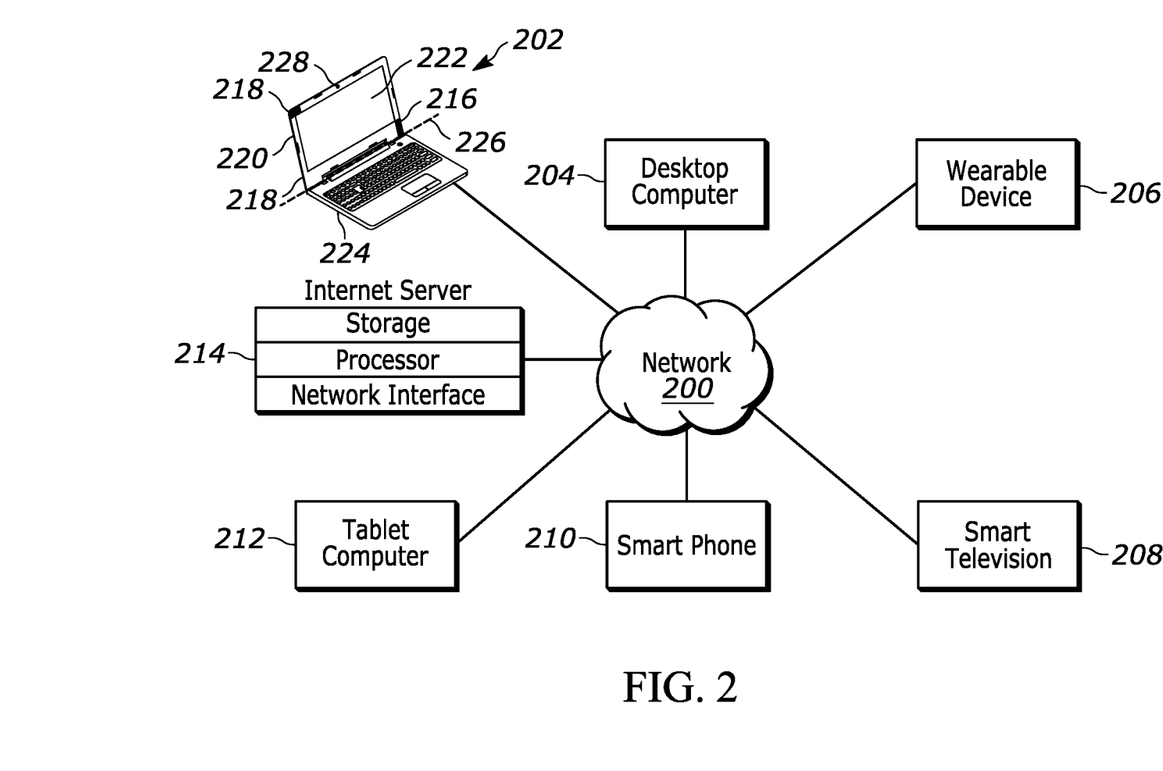
FIG. 2 is a block diagram of an example network of devices consistent with present principles.

Turning now to FIG. 2, example devices are shown communicating over a network 200 such as the Internet in accordance with present principles (e.g., for video conferencing). It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook/laptop computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles (e.g., route audio/video streams of users between devices for video conferencing).

Describing the laptop computer 202 in a bit more detail, it may include at least one potentiometer 216 and/or at least one accelerometer 218 on a top panel 220 of the laptop 202, the top panel 220 also bearing a display 222. The laptop 202 may rotate away from and toward a bottom panel 224 about a hinge (not shown) between the two panels 220, 224 that has an axis of rotation 226, and in example embodiments the potentiometer 216 may be located at or adjacent to the hinge to sense the radial positioning of the top panel 220 with respect to the bottom panel 224 about the hinge via the hinge itself. Also note that an inner face of the top panel 220 that bears the display 222 might also include a digital camera 228 that may be used for streaming video of a local user for video conferencing consistent with present principles.

Figure 3:
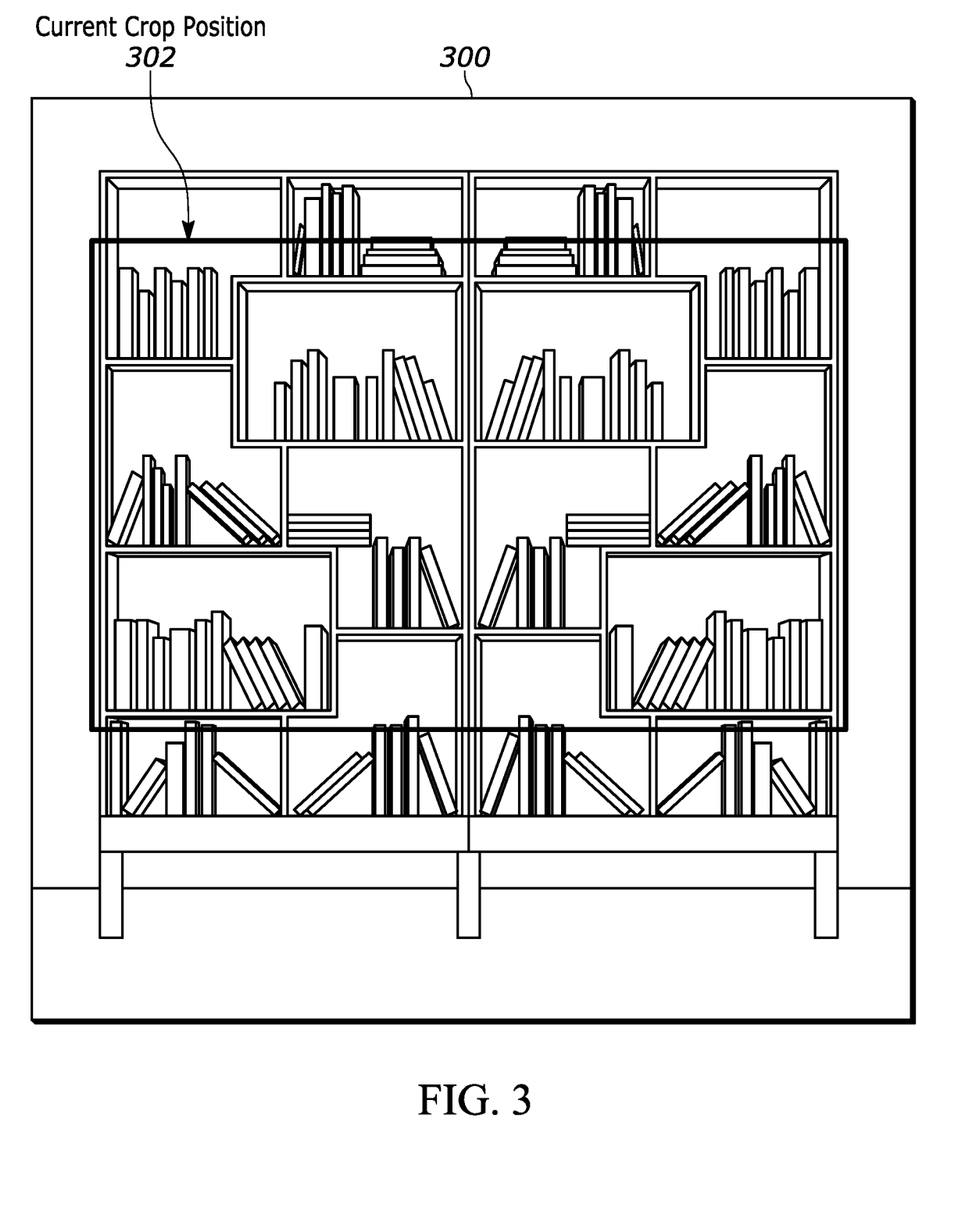
FIG. 3 shows an example image that may be used as a virtual background during video conferencing and indicates a cropped section to be applied as the virtual background.

Now describing FIG. 3, an example virtual background base 300 is shown. The virtual background base 300 may be established by a three-dimensional (3D) model such as one that might be used in a virtual reality (VR) application, computer game, etc. Additionally or alternatively, the virtual background base 300 may be established by a panoramic image, wide-angle image, or other image, such as an image from a user's own local personal photo gallery that was taken by the user themselves or even an image accessed from the Internet.

As may also be appreciated from FIG. 3, a current crop position is indicated via a box 302. Note here that since the 3D model or image may be cropped for presentation so that the cropped portion is applied as a virtual background behind a user as part of a video stream to others for video conferencing, the box 302 indicates the cropped portion that would be applied as the virtual background at a certain moment in time during the video conferencing. Note here that a cropped portion may include not only a simple rectangle snapshot but, in some examples, a rectilinear projection or other projection (e.g., from the 3D model).

Figure 4:
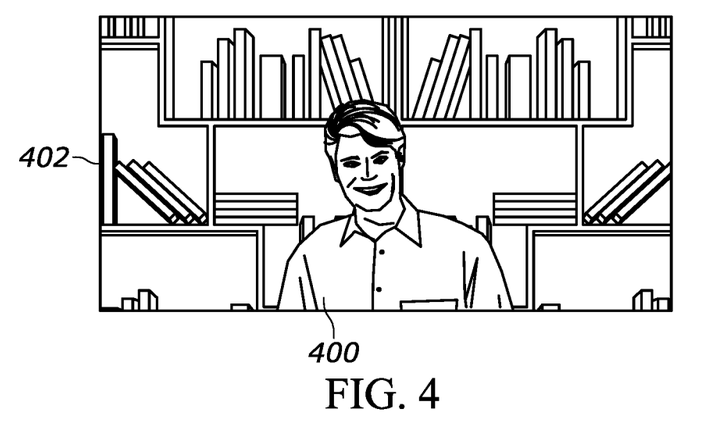
FIGS. 4-6 show various example perspectives of a user with a virtual background behind them as a hinge angle of a laptop changes consistent with present principles.
Figure 5:
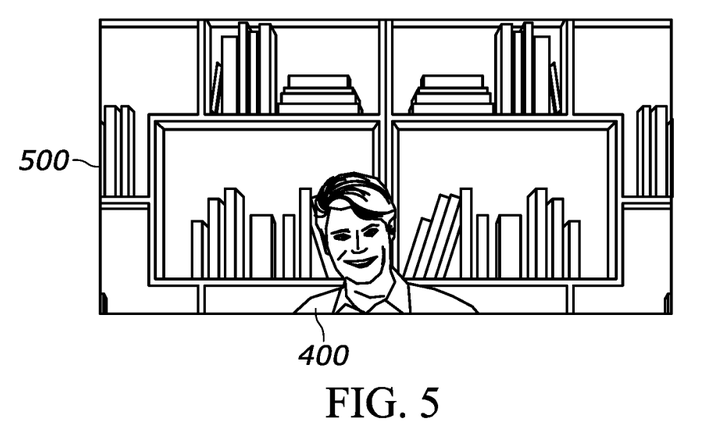
Figure 6:
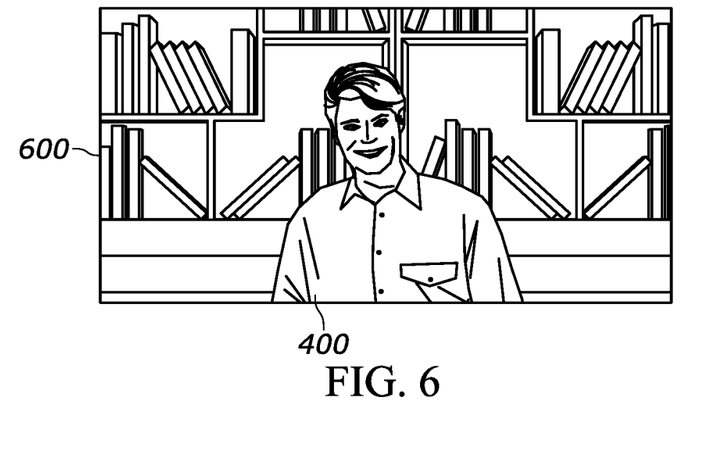

Now suppose that during the video conferencing, a user 400 as shown in FIGS. 4-6 is using a laptop computer with a hinge that connects a top panel with a display and camera to a bottom panel with a keyboard, processor, and other components such other components described above in reference to the system 100 of FIG. 1. For example, this laptop computer might be similar to the computer 202 described above.

Also suppose that at a first time T1 during the video conference as shown in FIG. 4, the user 400 has the laptop open with the top and bottom panels of the laptop positioned at a first angle with respect to each other based on movement of about hinge. For example, the angle may be ninety degrees such that the top panel is vertical with respect to Earth and the bottom panel is horizontal with respect to Earth as the bottom panel rests on a table top. A first crop 402 of the larger virtual background base that is being used (again, a 3D model or panoramic image, for example) may be applied as the virtual background for the user 400 during the video conference to mimic a real-world background behind the user 400 according to the current, real-time field of view of the camera on the inner surface of the laptop's top panel as it images the user.

Then suppose that at a second time T2 that is after time T1, the user moves the laptop panels with respect to each other such that the hinge angle increases, which in turn may result in the camera capturing a different part of the actual background behind the user 400 that includes additional area above the user's head and less area below the user's head. Based on detecting as much, the laptop (and/or a remotely-located coordinating server) may pan up in the 3D model or other image that is being used for the virtual background to show a second crop 500 as shown in FIG. 5 to thus change the perspective of the virtual background itself. The change to the second crop 500 may therefore mimic the actual change in the actual background as shown within the laptop camera's field of view, and so here the crop 500 itself may show additional area of the 3D model/image above the upper bounds of the crop 402 and less area above the lower bounds of the crop 402.

Now suppose that at a third time T3 that is after time T2, the user moves the laptop panels with respect to each other such that the hinge angle decreases past the hinge angle denoted by FIG. 4. This in turn may result in the laptop camera capturing a different part of the actual background behind the user 400 that includes less area above the user's head and more area below the user's head relative to FIG. 4. Based on detecting as much, the laptop (and/or remotely-located coordinating server) may pan down in the 3D model or other image that is being used for the virtual background to show a third crop 600 as shown in FIG. 6 to thus change the perspective of the virtual background. The change to the third crop 600 may therefore mimic the actual change in the actual background as shown within the laptop camera's field of view, and so here the crop 600 itself may show less area of the 3D model/image below the upper bounds of the crop 402 and more area below the lower bounds of the crop 402.

Accordingly, it may be appreciated that the cropping of the 3D model/image to establish the virtual background may move around within the 3D model/image over time so that the applied virtual background (the cropped portion) moves around in the same direction(s) as the real-world background moves according to the field of view of the laptop's camera. Thus, virtual background movement may mimic actual background movement within the field of view of the camera according to actual movement of the camera itself. In the present example involving hinge movement, also note that the laptop hinge itself may establish a reference point in virtual space for which the cropping of the 3D model/image may move radially based on radial movement of the laptop's top panel with respect to the bottom panel about the hinge in real world space.

However, further note that present principles may apply to more than just radial movement of one laptop panel with respect to another panel of the same laptop and that, for example, the laptop or another device of another type like a smartphone or tablet computer may move through real space over time (e.g., if the user walks from one room of a building to another with the device while video conferencing) and accordingly, the device may pan the cropped portion of the 3D model or image around the 3D model/image itself to mimic the movement/changing view of the actual background according the camera field of view itself.

Figure 7:
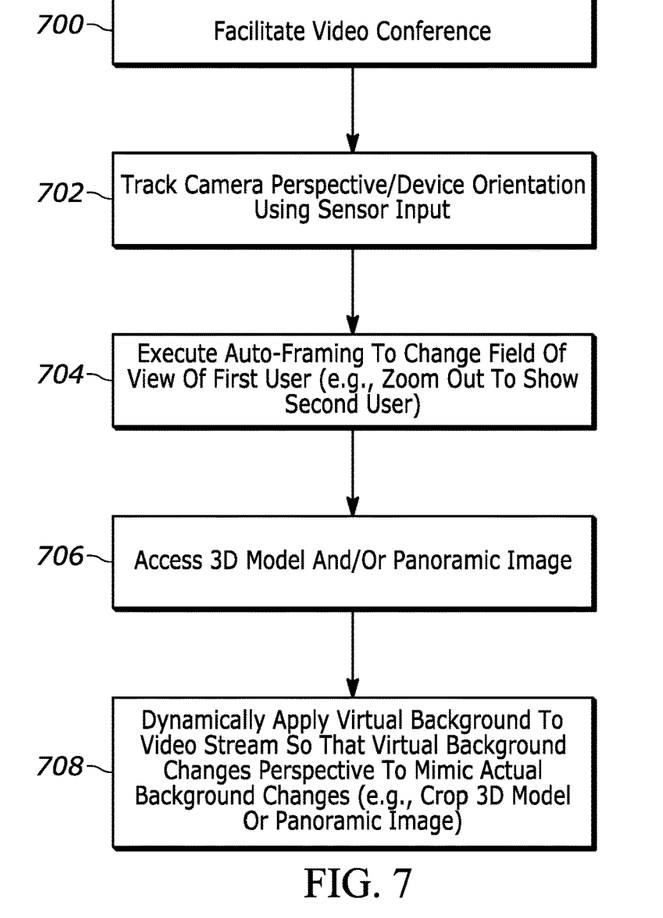
FIG. 7 illustrates example logic in example flow chart format that may be executed by a device consistent with present principles.

Continuing the detailed description in reference to FIG. 7, it shows example logic that may be executed by one or more devices such as a client device like the system 100 (or laptop 202) and/or a remotely-located coordinating video conference server in any appropriate combination consistent with present principles. Note that while the logic of FIG. 7 is shown in flow chart format, other suitable logic may also be used.

Beginning at block 700, the device may facilitate a video conference by transmitting audio video (A/V) content and metadata between conferencing devices, such as a client device transmitting its local camera and microphone streams to others and also receiving camera and microphone streams from other client devices of other participants for local presentation. Or at block 700 a coordinating server may route the A/V communications between the devices, possibly control one or more conferencing-related GUIs as presented locally at client devices of the respective participants, etc. From block 700 the logic may then proceed to block 702.

At block 702 the device may receive input from one or more sensors to identify changes to the actual background behind the subject video conference participant based on input from the one or more sensors. Should the input include camera input, at block 702 using the camera input and computer vision the device may then track the camera's perspective and/or device orientation over time to identify device movement/actual background movement for which corresponding virtual background movements should be applied (e.g., pan across the 3D model/image in the same direction as the device movement itself relative to the camera's field of view). The computer vision software that is executed might be Amazon's Rekognition or Google's Cloud Vision API, for example, or other appropriate image processing software (e.g., other spatial analysis software).

As another example, laptop panel movement via a laptop hinge may be tracked based on receiving potentiometer input at block 702, where the potentiometer itself is coupled to the hinge to sense the hinge's movement and hence top panel orientation. The potentiometer input may thus be used by the device to radially pan across a 3D model or image as described above, for example, according to radial movement of the associated camera itself to apply a cropped portion as the virtual background for the subject video conference participant.

As yet another example, at block 702 the device may receive input from an accelerometer and/or another inertial sensor such as a gyroscope to identify device orientation and/or movement indicated via the inertial sensor input. This might include tracking device orientation with respect to the direction of gravity (e.g., to determine the absolute orientation of the top panel of a laptop with respect to gravity) and/or executing a dead reckoning algorithm, for example. The device's identified movement may then be used to pan across a 3D model or image so that device movement corresponds to movement in the same direction(s) of the cropped portion of the 3D model/image being applied as the virtual background.

Further note that one or more of the foregoing techniques may also be used in combination for increased device confidence and/or more accurate actual background/virtual background movement mimicking. For example, camera input and inertial sensor input may be used in combination.

Still in reference to FIG. 7, from block 702 the logic may proceed to block 704. At block 704 the device may execute auto-framing software to change a field of view of the subject video conference participant already being shown in the video feed from the device's camera (referred to as a first user in FIG. 7), even if the actual location of the camera does not change. For example, the first user may move across real space and so auto-framing might be used to keep the first user in the center of the video stream even as the first user moves (and the camera does not). As another example, the device may identify a second user as partially or fully entering the camera's raw field of view and accordingly the device may zoom out to show a different field of view of the first user that also shows the second user (e.g., at least both people's faces). Thus, according to the first example immediately above the device may move the virtual background to mimic actual background movement as the first user moves but is kept more or less centered within the video stream. And according to the second example immediately above, the device may zoom out on the 3D model/image so that items in the virtual background appear at a different depth and possibly additional portions of the virtual background are shown as part of the crop according to the actual zoom out to include the faces of the first and second users. Further note that should the second user leave the camera's raw field of view, the device might zoom back in on the first user according to the auto-framing and in response the 3D model/image may also be zoomed back in accordingly to mimic the actual background/depth that would be shown according to the zooming in.

Thus, block 706 denotes that the actual 3D model or panoramic (or other) image may be accessed by the device if it has not been accessed already to then, at block 708, dynamically apply the virtual background to the video stream of the first user (and possibly second user) as described above so that the virtual background changes perspective to mimic actual background movement and changes (e.g., in the same direction as actual background movement, according to zoom levels being used, etc.). The video stream with virtual background may then be streamed to one or more other video conference participants for presentation via their own respective displays.

Figure 8:
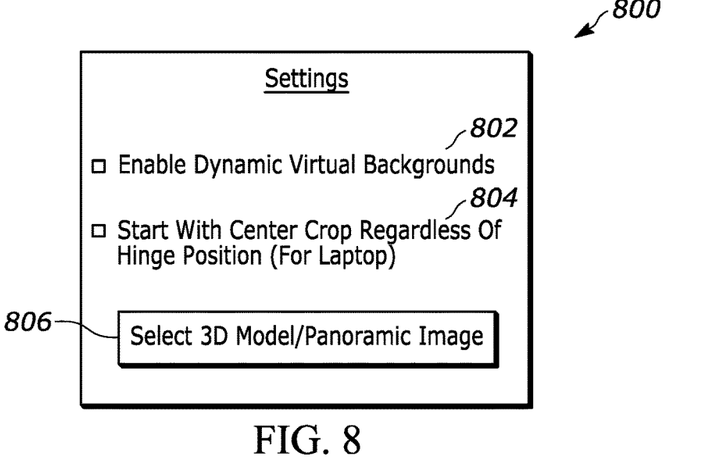
FIG. 8 shows an example graphical user interface (GUI) that may be presented on a display to configure one or more settings of a device or video conferencing software to operate consistent with present principles.

Now describing FIG. 8, an example settings graphical user interface (GUI) 800 is shown that may be presented on the display of a client device or other device to configure one or more settings of the device to operate consistent with present principles. For example, the GUI 800 may be presented on a client device display that might be undertaking the logic of FIG. 7, though the GUI 800 may also be presented on a display of a system administrator's device or other device as well.

The settings GUI 800 may be presented to set or enable one or more settings of the device to operate consistent with present principles. For example, the GUI 800 may be reached by navigating a main settings menu of the device or its operating system or even a settings menu at the video conference application level to configure one or more settings related to video conferencing. Also note that in the example shown, each option discussed below may be selected by directing touch, cursor, or other input to the respective check box adjacent to the respective option.

As shown in FIG. 8, the GUI 800 may include a first option 802 that may be selectable a single time to set or configure the device, system, software, etc. to undertake present principles in multiple future instances, such as executing the functions described above in reference to FIGS. 3-6 and executing the logic of FIG. 7 to dynamically change virtual background presentation for multiple future video conferences.

As also shown in FIG. 8, the GUI 800 may include a second option 804 that may be selectable to set or enable the device to start, for a laptop computer, with a center crop of a center portion of a 3D model or panoramic image (or other image) regardless of hinge position to then use that center crop as a reference point from which additional virtual background changes may be made as disclosed herein. Thus, for example, even if the top panel of laptop establishes an acute angle with respect to the bottom panel of the laptop, a center crop may initially be used rather than using a lower portion of the 3D model/image as might otherwise occur. This might be helpful in instances where a user prefers to use the laptop at that angle for conferencing but still wishes for a center portion of the virtual background to be applied.

If desired, the GUI 800 may also include a selector 806. The selector 806 may be selectable to launch another window or file browser from which a 3D model or panoramic image or other image may be selected (e.g., from the local device, from cloud storage, from a website, etc.) to use as a virtual background for video conferencing. Thus, the user might select a panoramic image they themselves took on vacation, or might select a 3D model of a building or other area they visited as generated using their own camera/device and execution of simultaneous localization and mapping (SLAM). For example, even if a user is working from home, they might wish to use a 3D model of their professional office space or place of business for video conferencing as they have already generated using SLAM.

Notwithstanding, further note that a virtual background consistent with present principles might also include a 3D model or panoramic image of a fictional scene, a scene from audio video content such as a famous motion picture, a fictional 3D simulation, or other computer-generated imagery (CGI).

Thus, in some examples especially for larger motion such as moving between rooms, or even for smaller movements, a procedurally-generated virtual background may be used. For example, the virtual background could be "at the beach", and as the user rotates the device, the relative positions of ocean, sand, and inland (e.g., palm trees) may be maintained as if the user were actually at the beach rotating their device. The beach scene may have been generated using light detection and ranging (Lidar) and/or simultaneous localization and mapping (SLAM), for example. But even if there are not enough actual data points for scene based on extreme device movement which would essentially result in leaving the scene, the scene may be virtually extended in real time as the device moves (rather being loaded prior to that) using image processing techniques to extend borders, boundaries, and features, insert additional images and objects of a same theme, complete partial images and objects that are already shown, etc.

Furthermore, note that present principles may be applied to gallery views where some or all video conference participants, though remotely-located from each other in real life, may be presented with a same common virtual background as if they were all in a same location together (e.g., same virtual conference room).

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
facilitate a video conference with a second device; and
apply a virtual background for a video stream provided to the second device as part of the video conference, the video stream also showing at least a user, the virtual background changing perspective as an actual background behind the user changes;
wherein the at least one processor identifies the actual background changing based on input from a potentiometer, and wherein the at least one processor initially applies the virtual background for the video stream according to a center crop of the virtual background, the center crop used as a reference point from which virtual background changes are made during the video conference based on input from the potentiometer.

2. The first device of claim 1, wherein a panoramic image is used to apply the virtual background, the panoramic image generated using a real-world camera.

3. The first device of claim 1, wherein the first device comprises one or more of: a server facilitating the video conference, a client device being used to participate in the video conference.

4. The first device of claim 1, comprising a camera that images the user as part of the video stream.

5. The first device of claim 1, comprising the potentiometer.

6. The first device of claim 1, wherein the potentiometer is configured to sense hinge rotation of a laptop computer.

7. The first device of claim 6, wherein the potentiometer is disposed at or adjacent to a hinge of the laptop computer to sense the hinge rotation.

8. The first device of claim 7, wherein the potentiometer is coupled to the hinge of the laptop computer to sense the hinge rotation.

9. The first device of claim 7, wherein the virtual background is initially applied for the video stream both according to the center crop of the virtual background and regardless of hinge angle for the hinge.

10. The first device of claim 7, wherein the hinge radially moves a first panel of the laptop computer bearing a display with respect to a second panel of the laptop computer bearing a keyboard.

11. The first device of claim 1, wherein the instructions are executable to:
present a settings graphical user interface (GUI) on a display, the settings GUI comprising an option that is selectable to set the at least one processor to change the perspective of the virtual background as the actual background behind the user changes.

12. The first device of claim 11, wherein the option is a first option, and wherein the settings GUI comprises a second option different from the first option, the second option being selectable to set the at least one processor to initially apply the virtual background for the video stream according to the center crop of the virtual background regardless of hinge angle for a laptop hinge.

13. The first device of claim 1, wherein the virtual background is a background generated via simultaneous localization and mapping (SLAM).

14. The first device of claim 1, wherein the virtual background is a background generated via light detection and ranging (Lidar).

15. A method, comprising:
facilitating, using a first device, a video conference with a second device;
applying a virtual background for a video stream provided to the second device as part of the video conference, the video stream also showing at least a user, the virtual background changing perspective as an actual background behind the user changes, wherein the actual background changing is determined based on input from a potentiometer, and wherein the virtual background is initially applied for the video stream according to a center crop of the virtual background, the center crop used as a reference point from which virtual background changes are made during the video conference based on input from the potentiometer.

16. The method of claim 15, wherein the potentiometer is configured to sense hinge rotation of a laptop computer's hinge.

17. The method of claim 16, wherein the potentiometer is coupled to the laptop computer's hinge to sense the hinge rotation.

18. At least one computer readable storage medium (CRSM) that is not a transitory signal, the computer readable storage medium comprising instructions executable by at least one processor to:
apply a virtual background for a video stream provided to a device as part of a video conference, the virtual background dynamically changing perspective as an actual background behind a user changes;
wherein the at least one processor identifies the actual background changing based on input from a potentiometer, and wherein the at least one processor initially applies the virtual background for the video stream according to a center crop of the virtual background, the center crop used as a reference point from which virtual background changes are made during the video conference based on input from the potentiometer.

19. The CRSM of claim 18, wherein the instructions are executable to:
present a graphical user interface (GUI) on a display, the GUI comprising a setting that is selectable to set the at least one processor to dynamically change the perspective of the virtual background during video conferencing.

20. The CRSM of claim 18, wherein the potentiometer is configured to sense hinge rotation of a laptop computer.

* * * * *